United States Patent [19]
McFrisby

[11] Patent Number: 4,561,665
[45] Date of Patent: Dec. 31, 1985

[54] COLLAPSIBLE SLED APPARATUS, AND METHODS OF CONSTRUCTING AND UTILIZING SAME

[75] Inventor: Samuel J. McFrisby, Detroit, Mich.

[73] Assignee: Joseph A. Ulicne, Grosse Ile, Mich. ; a part interest

[21] Appl. No.: 553,178

[22] Filed: Dec. 16, 1983

Related U.S. Application Data

[63] Continuation of Ser. No. 304,244, Sep. 21, 1981, abandoned.

[51] Int. Cl.$^4$ ............................................. B62B 13/16
[52] U.S. Cl. ......................................... 280/20; 280/15
[58] Field of Search .................... 280/12 S, 15, 19, 20, 280/39, 651; 108/34, 35, 36

[56] References Cited

U.S. PATENT DOCUMENTS

| 564,711 | 7/1896 | O'Brien | 108/35 |
| 1,050,396 | 1/1913 | Schneider | 280/19 |
| 1,378,598 | 5/1921 | Meyers | 280/39 |
| 2,472,920 | 6/1949 | Peenstra | 280/20 |
| 2,522,642 | 9/1958 | Schmidt | 108/36 |
| 4,378,828 | 4/1983 | Shiminski | 108/35 |

Primary Examiner—Joseph F. Peters, Jr.
Assistant Examiner—Joseph G. McCarthy
Attorney, Agent, or Firm—Irving M. Weiner; Joseph P. Carrier; John J. Cantarella

[57] ABSTRACT

A collapsible sled useful for carrying game comprises a pair of box-like sections within which there is pivotally mounted pairs of runners. The runners can be placed completely within the box-like sections for transport, and the latter sections closed upon each other to form a complete box with the runners within the box.

3 Claims, 7 Drawing Figures

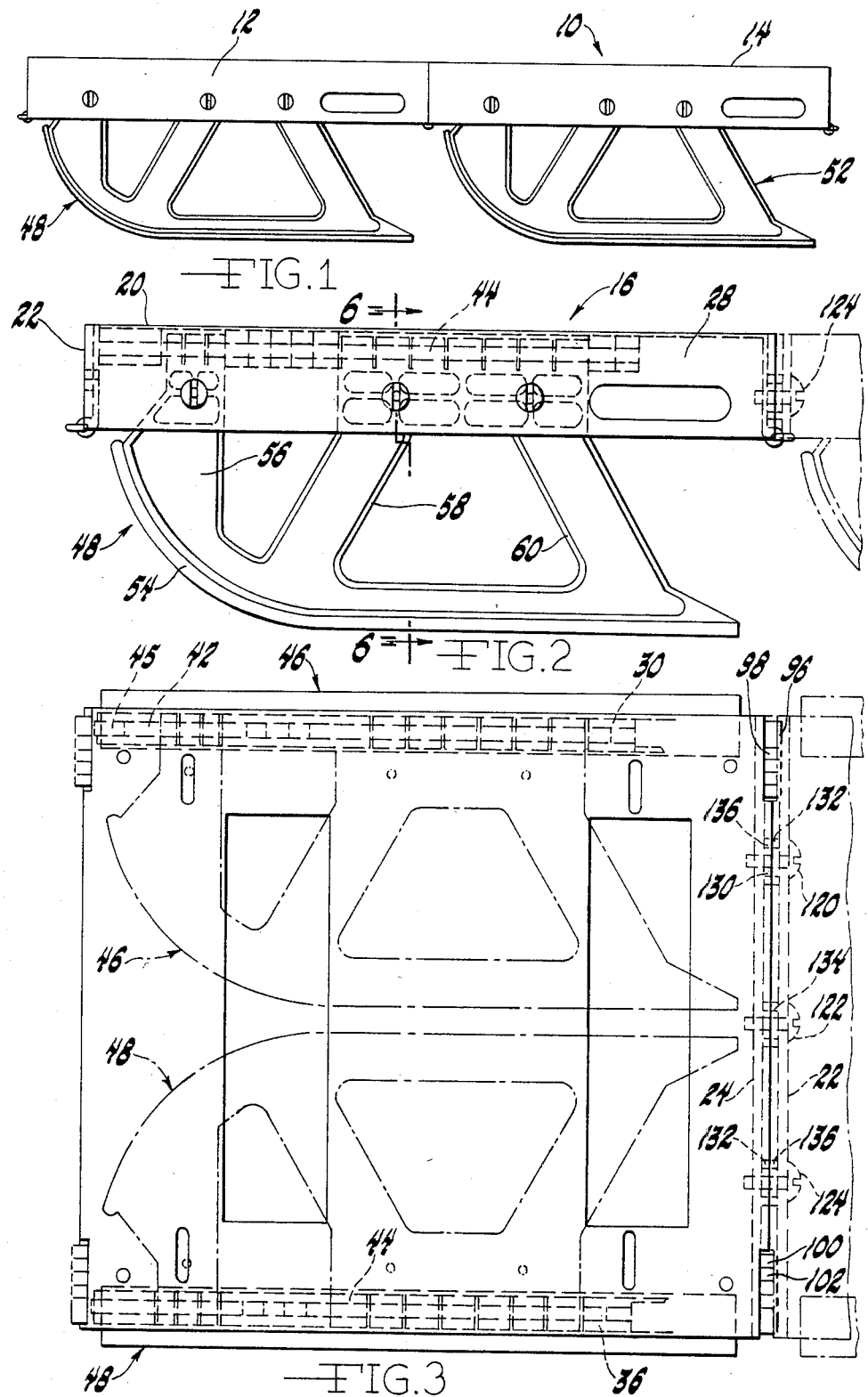

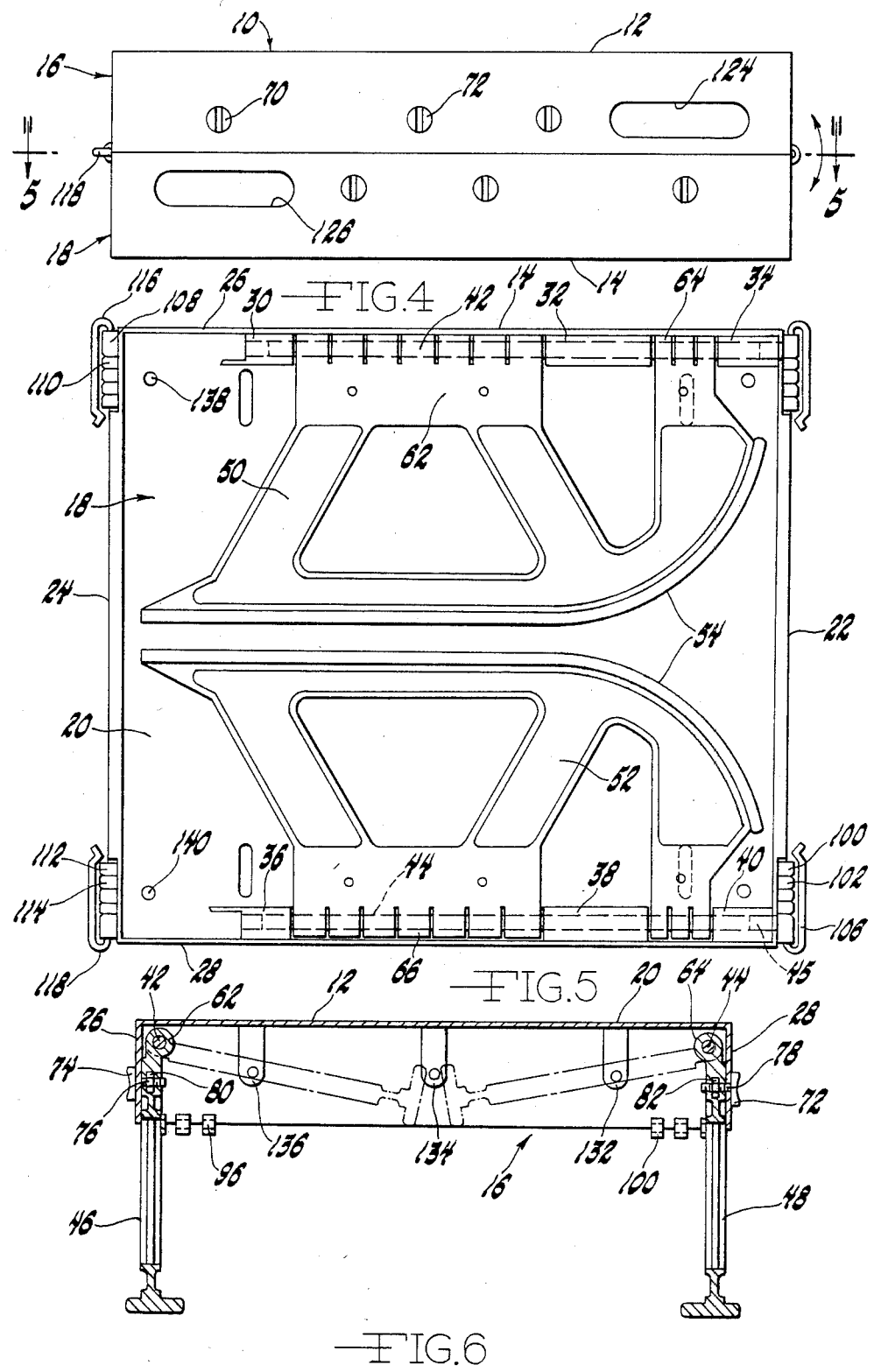

COLLAPSIBLE SLED APPARATUS, AND METHODS OF CONSTRUCTING AND UTILIZING SAME

This is a continuation of Application Ser. No. 304,244, filed Sept. 21, 1981, abandoned.

BACKGROUND OF THE INVENTION

1. Field of the Invention

This invention relates to sleds useful for transporting game over snow covered terrain. Some game is too heavy to carry more than a very short distance. In other instances the hunt is so bountiful that transport becomes a problem. Various sleds have been proposed for such purposes. This invention pertains to an improved collapsible sled which will facilitate the movement of game or supplies or the like from hunting locations to camp sites and other points where vehicles may be available.

2. Prior Art

Some of the previously known sleds are cumbersome and/or heavier than desirable for pulling and/or air transport. Others take up more space than desirable and/or have undesirably exposed runners, joints and frame members or the like when in collapsed condition. On the other hand, some known prior devices are complex and costly to build.

Among the known devices is that shown in the U.S. Pat. No. 2,472,920 granted to Peenstra on June 14, 1949 and entitled "FOLDING SLED". This patent discloses a folding sled for children which includes front and rear pairs of runners attached to a foldable platform. The runners are maintained in open or closed position by toggle links associated with slide blocks which fit in guides.

U.S. Pat. No. 2,673,744 issued in 1954 to Johnson entitled "FOLDABLE PORTABLE SLED" discloses a sled construction which includes a front unit and a rear unit. The units are provided with pairs of runners and angle bracket-like support members which extend upwardly from the runners. The forward section and the rearward section are pivotally connected so that they can be folded one upon the other to reduce the length of the sled. When folded the rear section nests within the forward section.

U.S. Pat. No. 3,580,592 issued in 1971 to Schrecengost entitled "COMBINATION DEER-CARCASS SLED AND CHAISE LOUNGE" discloses a sled device for conveying carcasses that is convertible into a chaise lounge. The device includes a frame having two parts which are hinged together for relative folding. A deck is formed on the frame by strung cord and there is also provided a cross piece. The sled includes a rear swivel leg and a pair of yokes and associated runners forwardly thereof. In its folded condition, the rear swivel leg is swung toward the front of the sled and rotated into a collapsed condition. The yokes and associated runners are swung outwardly and upwardly to rest on the top of the deck of the folded frame.

U.S. Pat. No. 3,583,722 issued in 1971 to Jacobson and entitled "COLLAPSIBLE BOBSLED" discloses a sled construction having a platform which has forward, intermediate and rear foldable sections. The forward and rear ends of the platform are provided with bunker plates adapted to releasably secure a detachable runner. When the sled is collapsed and folded there is defined a generally U-shaped configuration by the folded forward, intermediate and rear sections of the platform.

SUMMARY OF THE INVENTION

My invention provides a collapsible lightweight sled which can be easily swung from collapsed to useable position or vice versa and which can be readily transported by vehicles, aircraft and so forth without utilizing an excessive space and without limiting the load carrying capacity of the vehicle. Further, according to the invention the sled is constructed so as to be light enough to be carried by hunters or the like over ground which is not covered with snow and up inclines, etc.

The invention also provides a sled which is very compact when in its collapsed position, one which has runners which can be swung into use position and which however, when not in use, are completely contained within a box-like enclosure. The runners will not snag, and when in such a position the single unit can be carried, for example, in an aircraft, or in a van or the like, without undesirably exposed components. The invention further provides a foldable sled which forms a flat package having hand holds which can be readily handled. Further, according to the invention there is provided an easily manufactured and assembled device which can be relatively inexpensively produced as compared with more complex devices, such as known in the art.

According to the invention there is provided a collapsible sled for transporting articles comprising a front section and a rear section. The sections are pivotally connected with one section being pivotal with respect to the other through an arc of approximately 180°. Each section comprises a box-like member with each member comprising a supporting platform. Each section has a pair of runners with the runners being pivotally connected to each section respectively. Each of the runners comprises a lower shoe portion and an upwardly extending brace portion. The brace portion has a longitudinally extending pivot half which cooperates with pivot means on the box-like sections. The runners are pivotal from a position in which they are received within the box-like members and extend parallel to the platforms of said members to a position in which the runners extend downwardly from and perpendicularly to said platforms. There are means for locking the runners alternately in each of said positions.

The invention further provides a sled wherein the runners are pivotally connected to the box-like members about an axis extending within the latter members.

Additional features include the pivot axis for the runners being within the box-like members upwardly of the lower edges thereof, and the runners being concealed within the box-like members when they are in position for transport.

Yet another advantage of the invention is that the box-like members comprise side forming members depending from the platforms, with the runners being receivable within the members for transport, and the box-like members being pivotally connected adjacent lower edges thereof. The box-like members are rotatable with respect to each other, when the runners are respectively received therein, into facing contact with each other along the lowermost edges of the box-like members to form a closed box with the runners confined therein. There are means to secure the runners in this closed position. The invention further provides pivotal means and closure means comprising mating hinge members and pins.

BRIEF DESCRIPTION OF THE DRAWINGS

FIG. 1 is a side elevational view of a sled constructed in accordance with the invention.

FIG. 2 is a partial enlarged, side elevational view showing the forward section of the sled and inner details.

FIG. 3 is a top plan view of the sled section shown in FIG. 2.

FIG. 4 is a side elevational view showing the sled sections in folded transport position.

FIG. 5 is a bottom plan view of one of the sled sections.

FIG. 6 is a sectional view taken along line 6—6 of FIG. 5.

DESCRIPTION OF THE PREFERRED EMBODIMENT

Figure 7:
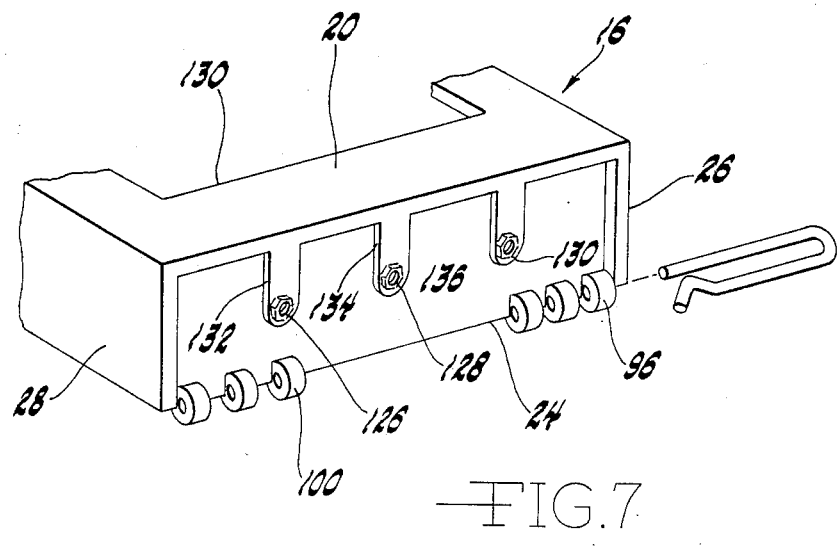
FIG. 7 is a fragmentary perspective view of an end of one section.

Referring now to the drawings, a collapsible sled 10 comprises a front section 12 and a rear section 14. The two sections are identical in construction, and the descriptive features hereinafter related to one section apply equally to the other.

As shown in FIGS. 2-6, the sections are formed of box-like enclosures 16 and 18. Each box-like enclosure comprises an upper support platform 20 and front and rear depending plates 22 and 24 as well as side plate members 26 and 28 respectively.

The front, rear and side plates cooperate with the support platform to form a box-like enclosure.

Within the enclosures thus formed there is provided a series of hinges 30, 32 and 34, and 36, 38 and 40, see particularly FIG. 5.

The hinges receive hinge pins 42 and 44 respectively on which are pivotally supported runners 46, 48, 50 and 52. The hinge pins are formed of extruded plastic rods. They, and their mating hinges, are dimensioned such that the inner ends are force fitted into hinge members 34 and 40 to further secure the rods.

The runners comprise blades 54 and supporting braces or frame members 56, 58 and 60. The frame members include hinge members 62, 64, 66 and 68, which receive respectively the hinge pins 42 and 44.

As illustrated in the drawings, the runners can be swung from a position within which they are received within the box-like sections 16 and 18, as shown in FIGS. 3 and 5, to a position in which they are extended and in position for sledding as illustrated in FIGS. 1, 2 and 6.

Fastening means comprising thumb screws 70, 72 and 74, and suitable openings such as 76 and 78 in the side plates of the box-like sections, as well as threaded nuts such as 80 and 82 embedded in the runners, are used to secure the runners in the open, sledding, position illustrated in FIGS. 2 and 6. The runners simply rest in the sections, in the phantom line positions shown in FIG. 6, when they are in the transport position. When in this position, illustrated also in FIGS. 3 and 5, the box sections are closed for carrying, in the manner shown in FIG. 4.

The two sections 12 and 14 are provided with mating hinge plates 96, 98, 100 and 102. These can be pivotally interconnected by removable hinge pins 104 and 106, see FIGS. 4 and 5. The sections further have mating hinge plates 108, 110, 112 and 114 at their opposite ends. The hinge plates are arranged such that the box-like enclosures, that is the front and rear sections, can be alternately positioned as shown in FIG. 1 or as in FIG. 4. In the latter position the hinge pins 104, 106, 116 and 118 are used to lock the two sections in closed position. The plates 96-102 and pins 104 and 106 are also used when rotating the sections from the open to the closed position or vice versa. When in the open position however, see FIGS. 1-3, the two sections are held in abutting relationship by thumb screws 120, 122 and 124. These screws cooperate with nuts 126, 128 and 130, embedded in braces 132, 134 and 136 in the respective facing front and rear plates 22 and 24, see FIG. 7.

As known in the art, thumb screws, with mounted nuts which can be embedded in one set of braces and nuts that can be embedded in the opposing braces on a facing section, are commercially available. Thus, the screws can remain in positions at all times as shown in FIG. 4. The thumb screws are used in securing the sections together in the operating condition, and holding the runners in operating condition, see FIGS. 1 and 2. The hinge pins 104, 106, 116 and 118 are only used in opening and closing the sections in maintaining the sections in closed position. The hinge pins are removed when the sled is in use.

The box-like members have suitable openings such as 124 and 125 to provide hand holds for facilitating movement of the sled when it is in the collapsed condition.

It is also contemplated that the sled can be used for sliding. The openings 124 and 126 also provide hand holds for this purpose. Two rope openings 138 and 140 are provided on both the front and rear sections for receiving rope for towing the sled.

The entire sled, including the runners, is formed of plastic, preferably polyethelene and fiberglass. This contributes to low weight.

As shown in FIG. 7, the mating end plates 22 and 24 are recessed within the side plates. The braces 132, 134 and 136 extend outwardly from the end plates sufficiently to be flush with the side plates and platform 20. The hinge members likewise project outwardly only a sufficient distance to mate and receive the hinge pins. As a result, the adjacent sections 10 and 12 can be merged to form a continuous platform by tightening the screws 120, 122 and 124.

From the above it will be seen that the invention provides a sled comprising a box-like enclosure in which the sled runners can be positioned while the sled is transported. This prevents snagging and protects the runners as well as users and their vehicles from damage. On the other hand I've provided a sled which has substantial supporting runners and a supporting platform whereby a substantial load can be readily carried. The sled further involves the minimum amount of parts and is easy to manufacture and assemble, as well as easy to put into use or put out of use into transport position. Complex details of construction and fastening or operating means are avoided.

This contributes to safety, strength and reliability of the sled, as well as making it easy to use and maintain.

While their have been shown and described preferred forms of the invention, it will be understood that other forms and variations can be devised within the scope of the invention and that accordingly the invention is to be limited to only the claims appended hereto.

I claim:

1. A collapsible sled for transporting articles, comprising:

a front section and a rear section substantially identical to said front section;

said front section having a first front hinge and an opposing first rear hinge;

said rear section having a second front hinge and an opposing second rear hinge;

said first rear hinge cooperating with said second front hinge to receive a pin for pivotally connecting said sections;

one section being pivotal with respect to the other through an arc of approximately 180°;

each section comprising a box-like member;

each said box-like member comprising a major support platform and side forming members depending from said major support platform;

each said section having a pair of runners;

said runners being pivotally connected to each said section respectively;

each said runner comprising a lower shoe portion and an upwardly extended brace portion;

said brace portion having a longitudinally extending hinge portion;

cooperating hinge means provided on one of said sections, said hinge means operatively cooperating with said hinge portion of said runner brace portion;

said runner being pivotal from a position in which it is received within said box-like member and extends substantially parallel to said major support platform of said box-like member to a position in which said runner extends downwardly directly from and perpendicularly to said major support platform;

means for selectively locking said runner only in said downwardly extending position;

said box-like members being pivotally connected adjacent the lower edges thereof;

said box-like members being rotatable with respect to each other when said runners are respectively received therein, into facing contact with each other along the lowermost edges of said side forming members to form a closed box with said runners confined therein; and said first front hinge cooperating with said second rear hinge to receive a means for securing said box in said closed position.

2. A collapsible sled according to claim 1, wherein:

said runners are pivotally connected to said box-like members about a pivot axis extending within said box-like members;

the pivot axis for said runners is within its associated box-like member and upwardly of the lower edges thereof;

said runners being concealed within its associated box-like member when the runners are in position for transport;

said adjacent lower edges of said box-like members comprise the lower edge of a rear side forming member of said front section and the lower edge of a front side forming member of said rear section; and handhold means are formed in at least one of said side forming members of each of said box-like members to facilitate movement of the sled when the sled is in said closed box condition and to facilitate sliding when the sled is in use.

3. A collapsible sled according to claim 1 wherein:

each section includes a depending rear side wall and a depending front side wall opposing and parallel to each other;

a bolt is provided normal to and in communication with said front side wall of said rear section and said rear side wall of said front section; and a nut is provided for tighteningly receiving said bolt, whereby said front section and said rear section are rigidly securable to each other.

* * * * *